(12) United States Patent
Marsch (10) Patent No.: US 12,461,200 B2
(45) Date of Patent: Nov. 4, 2025

(54) DETECTION OF BLOCKED RADAR SENSOR

(71) Applicant: MAGNA ELECTRONICS SWEDEN AB, Vargarda (SE)

(72) Inventor: Sebastian Marsch, Niederwerrn (DE)

(73) Assignee: MAGNA ELECTRONICS SWEDEN AB, Vårgårda (SE)

( * ) Notice: Subject to any disclaimer, the term of this patent is extended or adjusted under 35 U.S.C. 154(b) by 437 days.

(21) Appl. No.: 17/634,096

(22) PCT Filed: Aug. 12, 2020

(86) PCT No.: PCT/EP2020/072647
§ 371 (c)(1),
(2) Date: Feb. 9, 2022

(87) PCT Pub. No.: WO2021/028483
PCT Pub. Date: Feb. 18, 2021

(65) Prior Publication Data
US 2022/0349994 A1    Nov. 3, 2022

(30) Foreign Application Priority Data

Aug. 13, 2019 (EP) ..................... 19191505

(51) Int. Cl.
*G01S 7/40* (2006.01)
*G01S 13/58* (2006.01)
*G01S 13/931* (2020.01)

(52) U.S. Cl.
CPC .......... *G01S 7/4039* (2021.05); *G01S 13/584* (2013.01); *G01S 13/931* (2013.01)

(58) Field of Classification Search
CPC .... G01S 13/931; G01S 13/584; G01S 13/582; G01S 13/42; G01S 7/4039
(Continued)

(56) References Cited

U.S. PATENT DOCUMENTS 6,124,823 A * 9/2000 Tokoro ................. G01S 13/931
342/128
6,611,227 B1 * 8/2003 Nebiyeloul-Kifle .... G01S 7/412
342/195
(Continued)

FOREIGN PATENT DOCUMENTS

CN         109477892 A       3/2019
DE  10 2009 032 124 A1      1/2011
(Continued)

OTHER PUBLICATIONS

International Search Report and Written Opinion of PCT/EP2020/072647 mailed Nov. 2, 2020.
(Continued)

*Primary Examiner* — Michael W Justice
(74) *Attorney, Agent, or Firm* — DICKINSON WRIGHT PLLC (57) ABSTRACT

A method for detecting blockage of a radar sensor (105) by processing a radar signal (115, 116, 117) received by the radar sensor (105). The method includes obtaining (S1) the radar signal (115, 116, 117), determining (S2) a range-Doppler representation (300) of the radar signal such that received radar signal energy (311) is represented as a function of distance (d0-d13) and relative velocity (v0-v7), determining (S4) predetermined azimuth angles ($\theta_1$, $\theta_2$, $\theta_3$) for the radar sensor (105) and calculating (S31) a relative velocity (v0, v3, v5) for each predetermined azimuth angle ($\theta_1$, $\theta_2$, $\theta_3$). The method further includes obtaining (S5) a first distribution (301) and at least one other distribution (302, 303) of received energy (311) over distance in the range-Doppler representation (300) for a first azimuth angle ($\theta_1$) and at least one other azimuth angle ($\theta_2$, $\theta_3$), generating (S7) a measure of similarity for the distributions, and
(Continued)

detecting (S8) blockage of the radar sensor (105) if the measure of similarity satisfies a similarity criterion.

10 Claims, 5 Drawing Sheets

(58) Field of Classification Search
USPC .................................................. 342/70, 170
See application file for complete search history.

(56) References Cited

U.S. PATENT DOCUMENTS

| | | | | |
|---|---|---|---|---|
| 7,679,545 | B2* | 3/2010 | Rausch | G01S 13/56 |
| | | | | 342/194 |
| 7,760,336 | B2* | 7/2010 | Iwasawa | G01S 7/4802 |
| | | | | 356/5.01 |
| 7,852,217 | B2* | 12/2010 | Kondo | G01S 13/04 |
| | | | | 340/572.1 |
| 9,229,102 | B1* | 1/2016 | Wright | G01S 13/885 |
| 9,316,730 | B2* | 4/2016 | Kajiki | G01S 13/931 |
| 9,465,103 | B2* | 10/2016 | Sochen | G01S 13/58 |
| 9,759,807 | B2* | 9/2017 | Rao | H01Q 21/08 |
| 9,823,346 | B1* | 11/2017 | Doerry | G01S 13/904 |
| 10,042,041 | B2* | 8/2018 | Preussner | G01S 13/536 |
| 10,054,672 | B2* | 8/2018 | Fetterman | G01S 13/726 |
| 10,288,729 | B2* | 5/2019 | Doerry | G01S 7/414 |
| 11,061,127 | B2* | 7/2021 | Klotzbuecher | G01S 13/726 |
| 11,125,869 | B2* | 9/2021 | Santra | G01S 13/72 |
| 2006/0028369 | A1* | 2/2006 | Rausch | G01S 13/888 |
| | | | | 342/107 |
| 2009/0066513 | A1* | 3/2009 | Kondo | G01V 15/00 |
| | | | | 340/572.1 |
| 2009/0109421 | A1* | 4/2009 | Iwasawa | G01S 17/42 |
| | | | | 356/5.01 |
| 2013/0335261 | A1* | 12/2013 | Kajiki | G01S 13/931 |
| | | | | 342/107 |
| 2014/0035776 | A1* | 2/2014 | Sochen | G01S 13/582 |
| | | | | 342/107 |
| 2015/0185316 | A1* | 7/2015 | Rao | G01S 13/931 |
| | | | | 342/146 |
| 2015/0285904 | A1* | 10/2015 | Rao | G01S 13/06 |
| | | | | 342/146 |
| 2016/0320471 | A1* | 11/2016 | Preussner | G01S 7/4004 |
| 2017/0059695 | A1* | 3/2017 | Fetterman | G01S 13/931 |
| 2017/0269196 | A1* | 9/2017 | Millar | G01S 7/40 |
| 2017/0322296 | A1* | 11/2017 | Rao | G01S 13/42 |
| 2018/0003798 | A1* | 1/2018 | Rao | G01S 7/032 |
| 2018/0067205 | A1* | 3/2018 | Doerry | G01S 7/292 |
| 2020/0116850 | A1* | 4/2020 | Santra | A61B 5/0507 |

FOREIGN PATENT DOCUMENTS

| | | |
|---|---|---|
| EP | 0784213 A2 | 7/1997 |
| EP | 3460512 A1 | 3/2019 |
| WO | 9931525 A1 | 6/1999 |

OTHER PUBLICATIONS

Office Action regarding corresponding CN App. No. 2020800561743; dated Mar. 19, 2025.

* cited by examiner

DETECTION OF BLOCKED RADAR SENSOR

CROSS-REFERENCE TO RELATED APPLICATIONS

This application is a 35 U.S.C. § 371 national phase of PCT International Application No. PCT/EP2020/072647, filed Aug. 12, 2020, which claims the benefit of priority under 35 U.S.C. § 119 to European Patent Application No. 19191505.7, filed Aug. 13, 2019, the contents of which are incorporated herein by reference in their entirety.

FIELD OF THE DISCLOSURE

The present disclosure relates to a method for detecting blockage of a radar sensor by processing a radar signal received by the radar sensor.

BACKGROUND

Many vehicle radar systems have radar transceivers that are arranged for generating radar signals that are transmitted, reflected and received by means of appropriate antennas in the radar system. The radar signals may for example be in the form of FMCW (Frequency Modulated Continuous Wave) signals.

Sometimes it is difficult to distinguish between situations when a radar sensor has been blocked by an obstructing object, and when the environment presents few or an absence of reflecting objects. This is at least in part due to that there normally are strong reflections received from locations close to the radar transceiver even when the radar transceiver is operating normally. Thus, when adding a blocking object close to the radar transceiver, the received signal does not change significantly compared to normal operating conditions, but reflections from object more remote to the radar transceiver are not detected.

U.S. Pat. No. 10,042,041 B2 discloses a radar system where it is indicated when a radar detector at least partially is blocked. The approach described requires that the motion state of the radar system changes, for example from moving to standing.

U.S. Pat. No. 10,054,672 B2 discloses a radar system where blobs in an averaged range—Doppler map are used to indicate that a radar detector is unblocked. Such blobs are constituted by cycle-wise non-continuities in the detected magnitudes.

It is, however, desired to provide a faster, more stable and reliable method for determining whether a radar detector is blocked or not, and this constitutes an object of the present disclosure.

SUMMARY

This The above-described object is achieved by a method for detecting blockage of a radar sensor by processing a radar signal received by the radar sensor in accordance with the present disclosure. The method includes obtaining the radar signal, and determining a range-Doppler representation of the radar signal by processing the obtained radar signal such that received radar signal energy is represented as a function of distance and relative velocity. Furthermore, the method includes determining predetermined azimuth angles for the radar sensor, where each predetermined azimuth angle corresponds to a respective relative velocity, and calculating a relative velocity for each predetermined azimuth angle. The method further includes obtaining a first distribution of received energy over distance in the range-Doppler representation for a first azimuth angle and obtaining at least one other distribution of received energy over distance in the range-Doppler representation for at least one other azimuth angle, different from the first azimuth angle. The method also includes the step pf generating a measure of similarity by comparing the first distribution of detected energy over distance to the at least one other distribution of detected energy over distance; and detecting blockage of the radar sensor if the measure of similarity satisfies a similarity criterion.

In this way, it is possible to discriminate the two cases:
(1) the radar sensor is blocked
(2) the radar sensor does not detect anything, because there is no objects to detect, a so called desert case.

This discrimination can be performed in an uncomplicated, fast, efficient and reliable manner, avoiding that a radar sensor is unnecessarily determined to be blocked. The present disclosure provides this discrimination even in cases with relatively low Doppler resolution.

According to some aspects of the present disclosure, the range-Doppler representation is a matrix including matrix indices, where each matrix index corresponds to a distance and a relative velocity.

This means that a commonly known range-Doppler matrix representation can be used.

According to some aspects, the first azimuth angle corresponds to a first velocity that is a zero relative velocity.

In this manner, the present disclosure also works for the case with a radar sensor that is not moving.

According to some aspects of methods in accordance with the present disclosure, each azimuth angle is determined relative a reference line and an azimuth bearing.

In this manner, reliable and well-defined angles are provided.

According to some aspects of methods of the present disclosure, each distribution of detected energy over distance is obtained by integrating at least part of the range-Doppler representation over time, or over a plurality of radar sensor scans.

In this manner, an even more reliable discrimination is acquired.

According to some aspects of methods of the present disclosure, the first velocity and/or the at least one other velocity is adjusted based on a yaw rate and/or on a vehicle velocity over time, or between radar sensor scans.

In this manner, an even more reliable discrimination is acquired.

According to some aspects of methods of the present disclosure, each velocity relates to a relative motion of the radar sensor with respect to an object in a field of view of the radar sensor.

According to some aspects of methods of the present disclosure, the measure of similarity includes any of:
differences between means;
differences between variances;
Bhattacharyya distance;
Kullback-Leibler divergence; or
a Mahalanobis vector distance.

In other words, there are many well-known methods for obtaining a measure of similarity.

According to some aspects of methods of the present disclosure, the similarity criterion includes a pre-determined threshold value.

The above-described object is also is achieved by a radar system that is associated with the above advantages.

BRIEF DESCRIPTION OF THE DRAWINGS

The present disclosure will now be described in detail with reference to the appended drawings, where.

DETAILED DESCRIPTION

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 1:
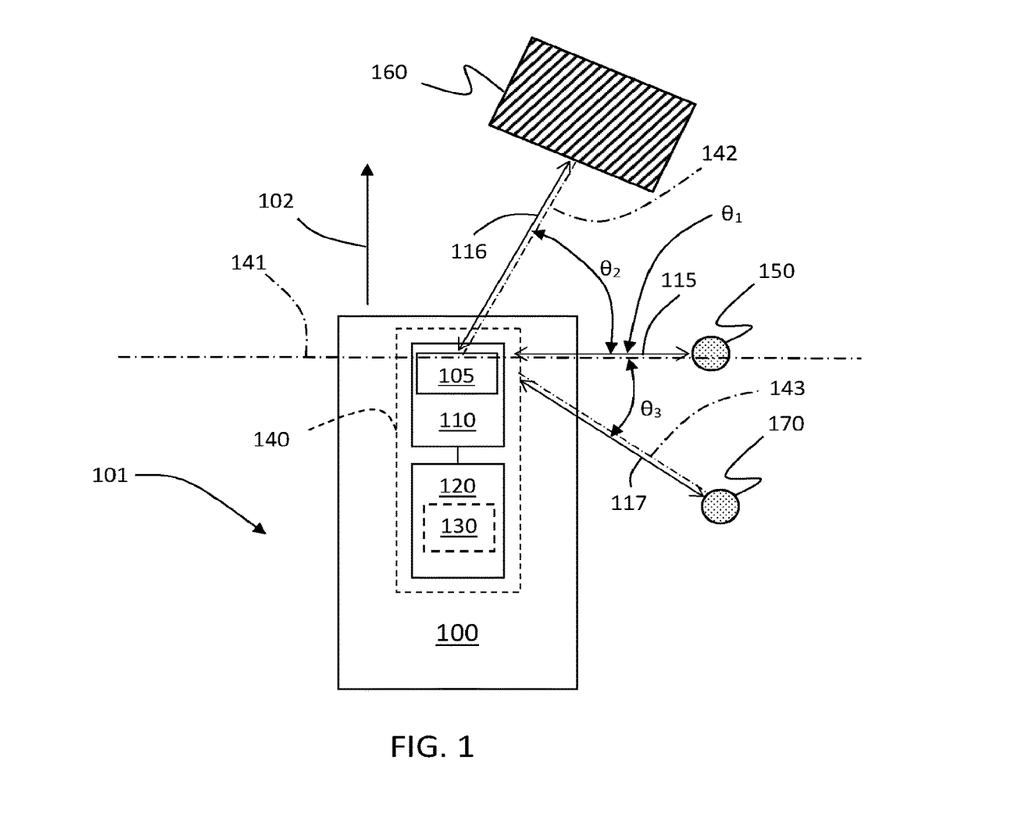
FIG. 1 shows a schematic top view of a vehicle with a radar transceiver.

FIG. 1 shows a vehicle 100 that travels on road 101 in a forward direction 102. The vehicle 100 includes a radar system 140 that in turn includes a control unit 120, a radar transceiver unit 110 with a radar sensor 105. The transceiver unit 110 is according to some aspects constituted by an FMCW (Frequency Modulated Continuous Wave) transceiver adapted to transmit radar signals and to receive corresponding reflected radar signals 115, 116, 117 that have been reflected by corresponding objects 150, 160, 170.

In this example embodiment, there is a first reflected radar signal 115 that has been reflected from a first object 150 at a first azimuth angle $\theta_1$, a second radar signal 116 that has been reflected from a second object 160 at a second azimuth angle $\theta_2$, and a third radar signal 117 that has been reflected from a third object 170 at a third azimuth angle 83. The azimuth angles $\theta_1$, $\theta_2$, $\theta_3$ are predetermined.

According to some aspects, each azimuth angle $\theta_1$, $\theta_2$, $\theta_3$ is determined relative a reference line 141 and corresponding azimuth bearing 141, 142, 143, where in this example a first azimuth bearing 141 that extends towards the first object 150 corresponds to the reference line 141.

The transceiver 110 has a relative motion with respect to the objects 150, 1560, 170. The radar signals 115, 116, 117 are mixed with the transmitted signal such that a difference signal that constitutes an IF (Intermediate Frequency) signal is obtained and filtered for each radar signal 115, 116, 117.

Figure 2:
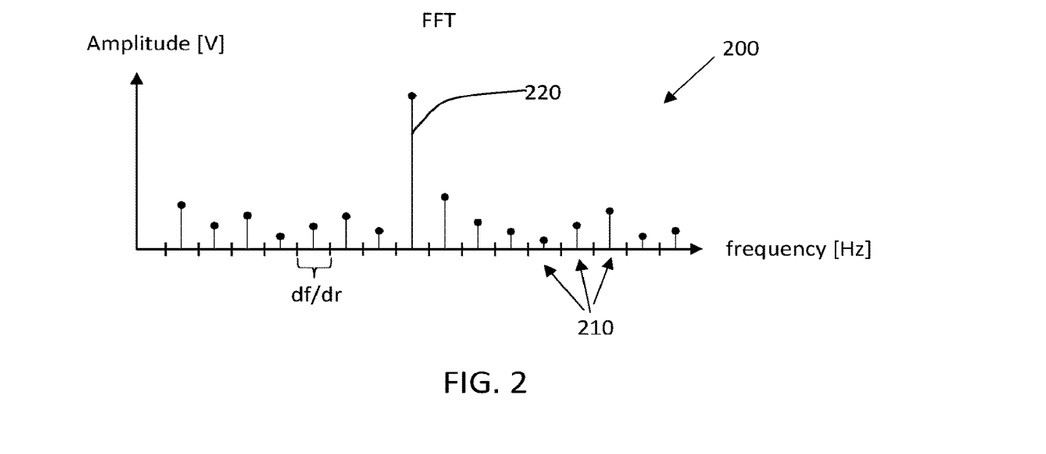
FIG. 2 schematically illustrates a radar signal frame.

By use of, for example, a first FFT (Fast Fourier Transform) the IF signal is transformed to a processed signal that, as shown in FIG. 2, forms frames 200, where each frame 200 corresponds to a respective time interval dt and according to some aspects is constituted by an FFT vector. Each frame 200 defines bins 210 configured according to a distance resolution dr of the processed signal, where the distance resolution dr is proportional to a corresponding frequency span df of each bin in a known manner. In each bin 210, there is a signal detection 220 that has a complex value, i.e. a magnitude and a phase angle.

Figure 3:
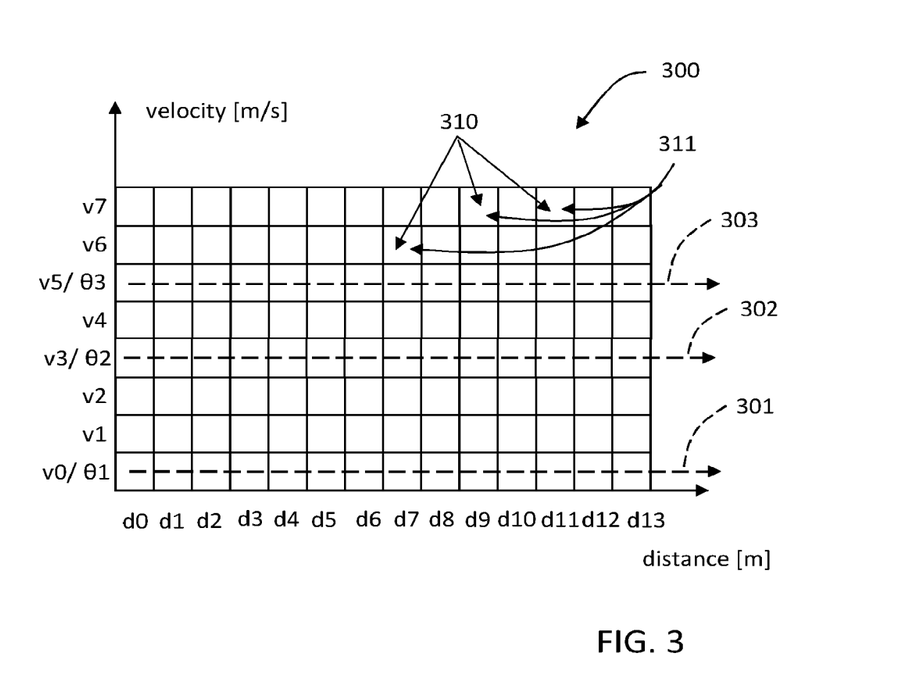
FIG. 3 illustrates a range-Doppler matrix.

With reference to FIG. 3, for example by use of a second FFT, the control unit 120 is adapted to determine a range-Doppler representation 300 of the radar signal by processing the obtained radar signals 115, 116, 117 such that received radar signal energy 311 is represented as a function of distance d0-d13 and relative velocity v0-v7. According to some aspects, the range-Doppler representation is a matrix defines matrix indices 310, where each matrix index corresponds to a distance d0-d13 and a relative velocity v0-v7.

The control unit 120 is adapted to detect blockage of the radar sensor 105 by processing a radar signal 115, 116, 117 received by the radar sensor 105, where the control unit 120 is adapted to determine the relative velocity v0, v3, v5 for each predetermined azimuth angle $\theta_1$, $\theta_2$, $\theta_3$.

According to the present disclosure, the control unit 120 is adapted to obtain a first distribution 301 of received energy 311 over distance in the range-Doppler representation 300 for a first azimuth angle $\theta_1$, a second distribution 302 of received energy 311 over distance in the range-Doppler representation 300 for a second azimuth angle $\theta_2$, and a third distribution 303 of received energy 311 over distance in the range-Doppler representation 300 for a third azimuth angle $\theta_3$.

The distributions 301, 302, 303 for example depend on radar antenna gain pattern, vehicle bumper configuration and reflectivity of ground surface.

According to some aspects, the distributions 301, 302, 303 are extracted from the Range-Doppler-Map representation 300 using interpolation by means of the relative velocity v0, v3, v5 that has been determined at the corresponding angle $\theta_1$, $\theta_2$, $\theta_3$.

According to some aspects, for a moving radar sensor, a relative velocity $v_{relative}$ at angle theta $\theta$ can be determined according to:

$$v_{relative} = (d_y \dot{\psi} - v_{host}) * \cos(\theta) - d_x * \dot{\psi} * \sin(\theta)$$

where
- dx is an x coordinate of the radar sensor relative to center of the rear axis of the vehicle in meters;
- dy is a y coordinate of the radar sensor relative to center of the rear axis of the vehicle in meters;
- $\dot{\psi}$ is a yaw rate of the vehicle in radians per second;
- $v_{host}$ is a velocity of the vehicle in the x direction in meters per second;
- $\theta$ is measured azimuth angle of the radar detection in radians; and
- $v_{relative}$ is expected relative velocity of the radar detection in meters per second.

According to some aspects, in order to compensate for error sources such as background noise, each distribution 301, 302, 303 of detected energy over distance is obtained by integrating at least part of the range-Doppler representation over time, or over a plurality of radar sensor scans.

The control unit 120 is further adapted to generate a measure of similarity by comparing the first distribution 301 of detected energy over distance to the other distributions of detected energy 302, 303 over distance, and to detecting blockage of the radar sensor 105 if the measure of similarity satisfies a similarity criterion.

According to some aspects, the measure of similarity includes any of:
- differences between means;
- differences between variances;
- Bhattacharyya distance;

Kullback-Leibler divergence; or a Mahalanobis vector distance.

According to some aspects of embodiments of the present invention, the similarity criterion includes a pre-determined threshold value.

Figure 4:
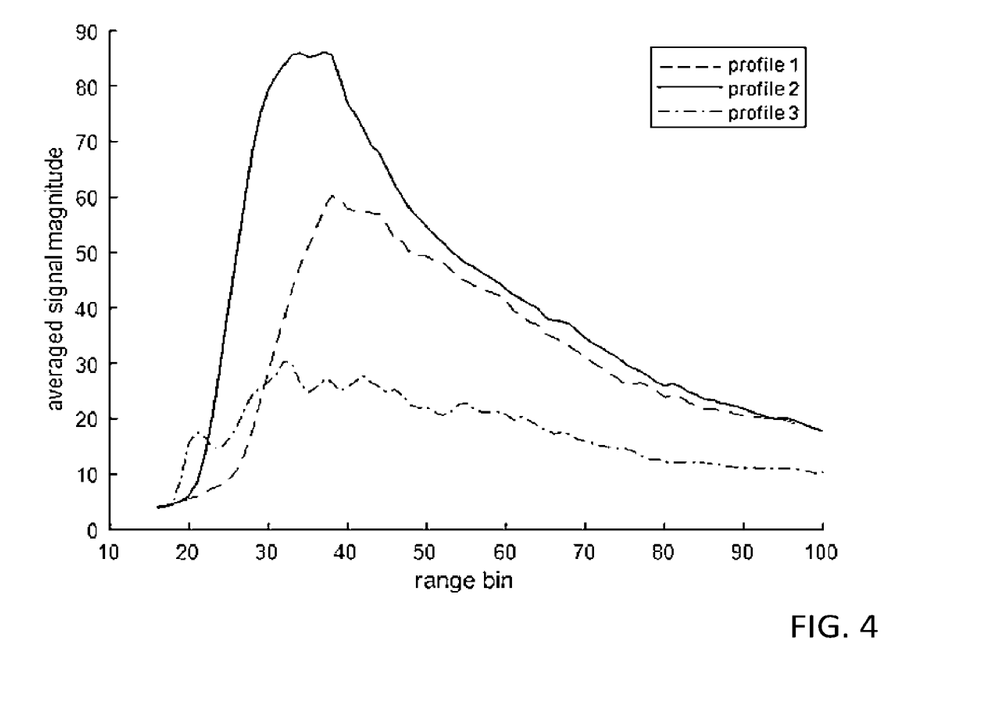
FIG. 4 illustrates three integrated profiles in a blocked scenario.

More in detail, if the distributions 301, 302, 303 are mutually different to a certain degree, the ground and/or other obstacles are visible to the radar sensor 105. This is illustrated in the example in FIG. 4 where the distributions 301, 302, 303, corresponding to profile 1, profile 3 and profile 3, are shown after 10 seconds integration as averaged signal magnitude versus range bin.

If the radar sensor is blocked, nothing is visible to the radar sensor 105, thus the distributions 301, 302, 303 correspond to the thermal noise floor that is the frequency response of the radar system 140 in every direction. In this case the distributions 301, 302, 303 are mutually similar. This is illustrated in the example in FIG. 5 where the distributions 301, 302, 303, corresponding to profile 1, profile 3 and profile 3, are shown after 10 seconds integration as averaged signal magnitude versus range bin.

Figure 5:
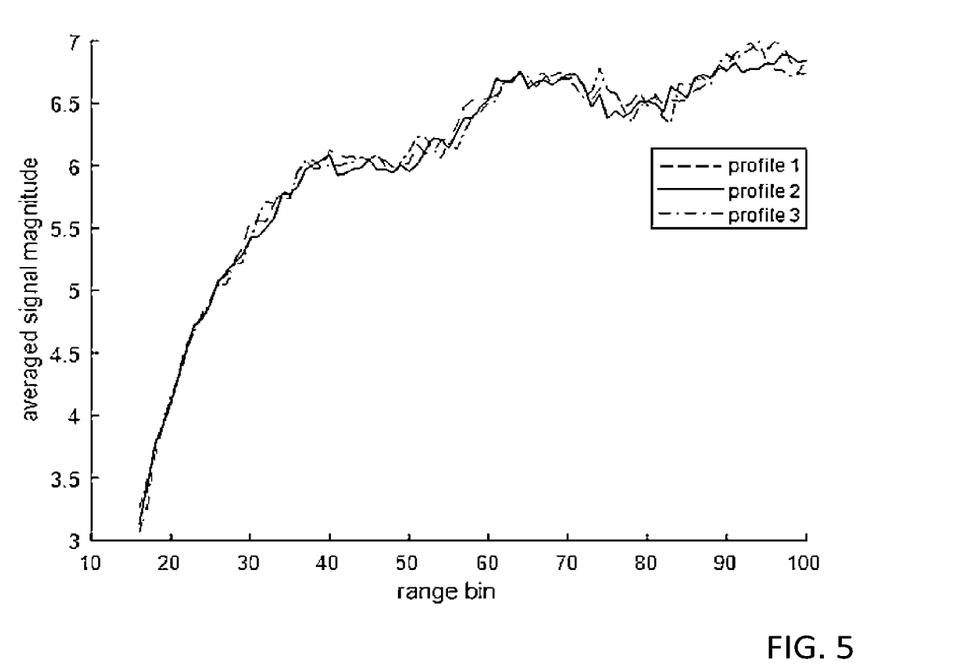
FIG. 5 illustrates three integrated profiles in an unblocked scenario.

In theory, if the sensor 105 is blocked, nothing is visible to the radar sensor 105, the distributions 301, 302, 303 should be the same, showing only the noise floor. But in reality they differ slightly. According to some aspects, if at some ranges more difference is expected than at other ranges, using a Mahalanobi distance vector can accounts for such a difference.

The spread between the profiles after a certain integration is calculated as a difference between maximum and minimum value of the distributions 301, 302, 303 at each range bin. The values are smoothed and taken as sigmas for the Mahalanobis distance. If a distribution 301, 302, 303 consists of n range bins, the pure Mahalanobis distance of a blocked radar sensor is thus approximately $\sqrt{n}$. To make the distance measure independent of the length of the distribution, it should be divided by $\sqrt{n}$.

This distance is calculated pairwise between all distributions, resulting in $m*(m-1)/2$ distances $D(i,j)$ form distributions; e.g. for three distributions it results in three distances, and the maximum of all distances $D_{max}$ is taken for classification.

A blocked radar sensor will have $D_{max} \approx 1$.

An unblocked radar sensor will have $D_{max} \gg 1$.

For the case that the radar sensor is not moving, everything from the stationary environment collects in Doppler bin 0, and in the other Doppler bins only thermal noise is visible. This means that it is sufficient to compare the distribution at bin 0 with the distribution any other bins. This can be applied to the above having the first azimuth angle $\theta_1$ correspond to a first velocity v0 that is a zero relative velocity.

According to some aspects, a rank order filter along a Doppler direction can be applied to suppress energy of moving targets. If the distributions are similar, no environment can be seen and thus the sensor is blocked. If they are different, the sensor is not blocked.

Figure 6:
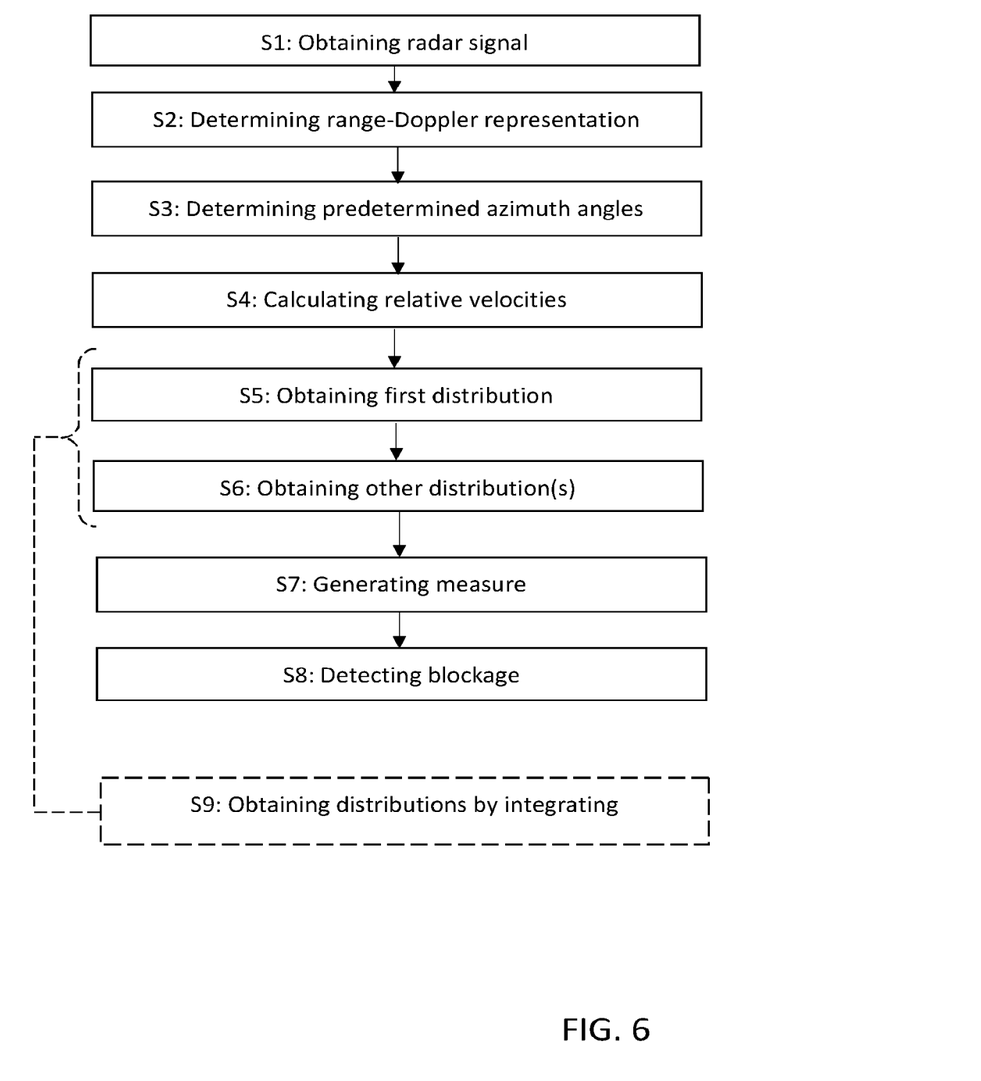
FIG. 6 is a flow chart illustrating methods.

With reference to FIG. 6, the present disclosure relates to a method for detecting blockage of a radar sensor 105 by processing a radar signal 115, 116, 117 received by the radar sensor 105. The method includes obtaining S1 the radar signal 115, 116, 117 and determining S2 a range-Doppler representation 300 of the radar signal by processing the obtained radar signal 115, 116, 117 such that received radar signal energy 311 is represented as a function of distance d0-d13 and relative velocity v0-v7. The method further includes the step of determining S4 predetermined azimuth angles $\theta_1$, $\theta_2$, $\theta_3$ for the radar sensor 105, where each predetermined azimuth angle $\theta_1$, $\theta_2$, $\theta_3$ corresponds to a respective relative velocity v0, v3, v5 and calculating S31 a relative velocity v0, v3, v5 for each predetermined azimuth angle $\theta_1$, $\theta_2$, $\theta_3$. Furthermore, the method includes obtaining S5 a first distribution 301 of received energy 311 over distance in the range-Doppler representation 300 for a first azimuth angle $\theta_1$, and obtaining S6 at least one other distribution 302, 303 of received energy 311 over distance in the range-Doppler representation 300 for at least one other azimuth angle $\theta_2$, $\theta_3$, different from the first azimuth angle $\theta_1$. The method also includes the step of generating S7 a measure of similarity by comparing the first distribution 301 of detected energy over distance to the at least one other distribution of detected energy 302, 303 over distance; and detecting S8 blockage of the radar sensor 105 if the measure of similarity satisfies a similarity criterion.

According to some aspects of embodiments of the present invention, the range-Doppler representation is a matrix includes matrix indices 310, where each matrix index corresponds to a distance d0-d13 and a relative velocity v0-v7.

According to some aspects of embodiments of the present invention, the first azimuth angle $\theta_1$ corresponds to a first velocity v0 that is a zero relative velocity.

According to some aspects of embodiments of the present invention, each such azimuth angle $\theta_1$, $\theta_2$, $\theta_3$ is determined relative a reference line 141 and an azimuth bearing 140, 141, 142.

According to some aspects of embodiments of the present invention, each distribution 301, 302, 303 of detected energy over distance is obtained by integrating S9 at least part of the range-Doppler representation over time, or over a plurality of radar sensor scans.

According to some aspects of embodiments of the present invention, the first velocity v0 and/or the at least one other velocity v3, v5 is adjusted based on a yaw rate and/or on a vehicle velocity over time, or between radar sensor scans.

According to some aspects of embodiments of the present invention, each velocity v0, v3, v5 relates to a relative motion of the radar sensor with respect to an object 150, 160, 170 in a field of view of the radar sensor 105.

According to some aspects of embodiments of the present invention, the measure of similarity includes any of:

differences between means;

differences between variances;

Bhattacharyya distance; or

Kullback-Leibler divergence.

According to some aspects of embodiments of the present invention, the measure of similarity is a Mahalanobis vector distance.

According to some aspects of embodiments of the present invention, the similarity criterion includes a pre-determined threshold value.

Figure 7:
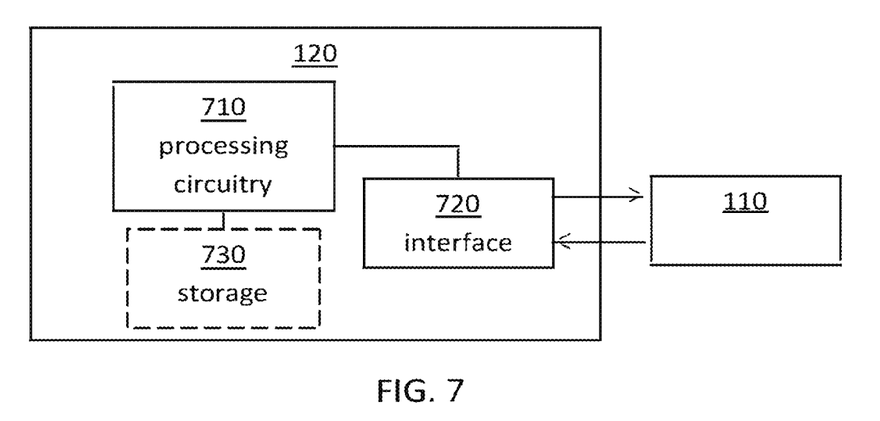
FIG. 7 schematically illustrates a control unit.

The methods and techniques discussed above can be realized in various forms of hardware. FIG. 7 schematically illustrates, in terms of a number of functional units, the components of a control unit 120 according to an embodiment of the above discussions. Processing circuitry 710 is provided using any combination of one or more of a suitable central processing unit CPU, multiprocessor, microcontroller, digital signal processor DSP, etc., capable of executing software instructions stored in a computer program product, e.g. in the form of a storage medium 730. The processing circuitry 710 may further be provided as at least one application specific integrated circuit ASIC, or field programmable gate array FPGA.

Particularly, the processing circuitry 710 is configured to cause the control unit 120 to perform a set of operations, or steps. For example, the storage medium 730 may store the set of operations, and the processing circuitry 710 may be configured to retrieve the set of operations from the storage medium 730 to cause the control unit 120 to perform the set of operations. The set of operations may be provided as a set of executable instructions. Thus, the processing circuitry 710 is thereby arranged to execute methods as herein disclosed.

The storage medium 730 may also include persistent storage, which, for example, can be any single one or combination of magnetic memory, optical memory, solid state memory or even remotely mounted memory.

The control unit 120 may further include a communications interface 720 for communications with at least one external device such as the radar sensor 105. As such the communication interface 720 may include one or more transmitters and receivers, as analogue and digital components and a suitable number of ports for wireline or wireless communication.

The processing circuitry 710 controls the general operation of the control unit 120 e.g. by sending data and control signals to the communication interface 720 and the storage medium 730, by receiving data and reports from the communication interface 720, and by retrieving data and instructions from the storage medium 730. Other components, as well as the related functionality, of the control unit 120 are omitted in order not to obscure the concepts presented herein.

Figure 8:
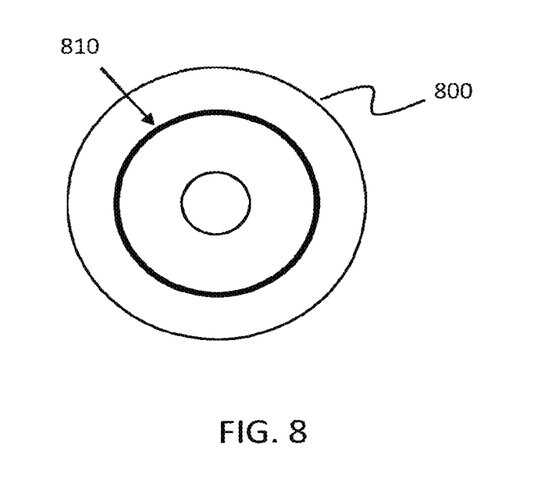
FIG. 8 shows an example computer program product.

FIG. 8 shows a computer program product 800 executing computer executable instructions 810. The computer executable instructions may, e.g., be executed by a control unit 120 as described above to perform the herein disclosed methods.

Generally, the present disclosure also relates to a radar system 140, including a control unit 120, a radar transceiver unit 110 and a radar sensor 105, where the control unit 120 is adapted to detect blockage of the radar sensor 105 by processing a radar signal 115, 116, 117 received by the radar sensor 105, where the control unit 120 is adapted to obtain the radar signal 115, 116, 117 and to determine a range-Doppler representation 300 of the radar signal by processing the obtained radar signal 115, 116, 117 such that received radar signal energy 311 is represented as a function of distance d0-d13 and relative velocity v0-v7.

The control unit 120 is further adapted to determine predetermined azimuth angles $\theta_1$, $\theta_2$, $\theta_3$ for the radar sensor 105, where each predetermined azimuth angle $\theta_1$, $\theta_2$, $\theta_3$ corresponds to a respective relative velocity v0, v3, v5, and to calculate a relative velocity v0, v3, v5 for each predetermined azimuth angle $\theta_1$, $\theta_2$, $\theta_3$. Furthermore, the control unit further is adapted to obtain a first distribution 301 of received energy 311 over distance in the range-Doppler representation 300 for a first azimuth angle $\theta_1$ and to obtain at least one other distribution 302, 303 of received energy 311 over distance in the range-Doppler representation 300 for at least one other azimuth angle $\theta_2$, $\theta_3$, different from the first azimuth angle $\theta_1$. The control unit 120 is also adapted to generate a measure of similarity by comparing the first distribution 301 of detected energy over distance to the at least one other distribution of detected energy 302, 303 over distance, and to detect blockage of the radar sensor 105 if the measure of similarity satisfies a similarity criterion.

According to some aspects, the control unit 120 is adapted to integrate at least part of the range-Doppler representation over time, or over a plurality of radar sensor scans, to obtain each distribution 301, 302, 303 of detected energy over distance.

The present disclosure is not limited to the above but may vary within the scope of the appended claims. For example, the present disclosure is applicable for all types of radar sensors.

While the above description constitutes the preferred embodiment of the present invention, it will be appreciated that the invention is susceptible to modification, variation and change without departing from the proper scope and fair meaning of the accompanying claims.

The invention claimed is:

1. A radar system for a vehicle, comprising:
a radar transceiver unit including a radar sensor; and
an electronic control unit configured to receive, from the radar transceiver unit, a signal representing the radar signal, wherein the electronic control unit is further configured to:
determine, based on the signal representing the radar signal, a range-Doppler representation of the radar signal by processing the signal representing the radar signal such that received radar signal energy is represented as a function of distance and relative velocity;
determine a plurality of predetermined azimuth angles for the radar sensor, where each predetermined azimuth angle of the plurality of predetermined azimuth angles corresponds to a respective relative velocity;
calculate a relative velocity for each predetermined azimuth angle of the plurality of predetermined azimuth angles;
integrate at least part of the range-Doppler representation of the radar signal over time to obtain each of:
a first distribution of detected energy over distance for a first azimuth angle of the plurality of predetermined azimuth angles, and at least one other distribution of detected energy over distance for at least one other azimuth angle of the plurality of predetermined azimuth angles, different from the first azimuth angle;
compare the first distribution of detected energy over distance to the at least one other distribution of detected energy over distance to generate a measure of similarity; and
determine if the measure of similarity satisfies a similarity criterion, to thereby distinguish between a blockage of the radar sensor and a case where there are no objects within a field of view of the radar sensor.

2. The radar system according to claim 1, wherein integrating the at least part of the range-Doppler representation of the radar signal over time includes integrating the at least part of the range-Doppler representation of the radar signal over a period of 10 seconds.

3. The radar system according to claim 1, wherein each of the first distribution of detected energy over distance and the at least one other distribution of detected energy over distance represents an averaged signal magnitude versus range bin.

4. The radar system according to claim 1, wherein the range-Doppler representation is a matrix comprising matrix indices, where each matrix index corresponds to a distance and a relative velocity.

5. The radar system according to claim 1, wherein the first azimuth angle corresponds to a first velocity that is a zero relative velocity.

6. The radar system according to claim 1, wherein the measure of similarity comprises any of:
- differences between means;
- differences between variances;
- Bhattacharyya distance;
- Kullback-Leibler divergence; or
- a Mahalanobis vector distance.

7. The radar system according to claim 1, wherein the similarity criterion comprises a pre-determined threshold value.

8. The radar system according to claim 1, wherein the electronic control unit is further adapted to determine each azimuth angle of the plurality of predetermined azimuth angles relative to a reference line and an azimuth bearing.

9. The radar system according to claim 1, wherein the electronic control unit is further adapted to adjust the first velocity or the at least one other velocity based on a yaw rate or on a vehicle velocity over time, or between radar sensor scans.

10. The radar system according to claim 1, wherein each of the first velocity and the at least one other velocity relates to a relative motion of the radar sensor with respect to an object in a field of view of the radar sensor.

* * * * *